United States Patent [19]

Cornu et al.

[11] Patent Number: 4,592,888
[45] Date of Patent: Jun. 3, 1986

[54] DEVICE FOR EMERGENCY REMOVAL OF THE HEAT DISSIPATED BY A FAST BREEDER NUCLEAR REACTOR WHEN SHUT DOWN

[75] Inventors: Bernard Cornu, Les Glayes Sous Bois; René Lion, Saint-Cloud, both of France

[73] Assignee: Novatome, Le Plessis Robinson, France

[21] Appl. No.: 442,215

[22] Filed: Nov. 16, 1982

[30] Foreign Application Priority Data

Dec. 31, 1981 [FR] France .................................. 81 24596

[51] Int. Cl.⁴ .............................................. G21C 15/18
[52] U.S. Cl. .................................... 376/299; 376/405; 165/163
[58] Field of Search .................... 376/405, 299, 298; 165/163, 162, 160

[56] References Cited

U.S. PATENT DOCUMENTS

| | | | |
|---|---|---|---|
| 3,805,890 | 4/1974 | Boardman et al. | 165/163 |
| 4,058,161 | 11/1977 | Trepaud | 165/162 X |
| 4,083,695 | 4/1978 | Haese et al. | 165/162 X |
| 4,163,470 | 8/1979 | Johnsen et al. | 165/160 X |
| 4,294,659 | 10/1981 | Campbell | 376/405 X |
| 4,296,799 | 10/1981 | Steele | 165/163 X |
| 4,312,703 | 1/1982 | Wondstra | 376/299 |
| 4,336,614 | 6/1982 | Mitchell et al. | 376/405 |
| 4,342,721 | 8/1982 | Pomie et al. | 376/405 X |
| 4,359,088 | 11/1982 | Jabsen | 165/162 X |
| 4,377,552 | 3/1983 | Doublet et al. | 376/405 |

FOREIGN PATENT DOCUMENTS

| | | | |
|---|---|---|---|
| 0083545 | 7/1983 | European Pat. Off. | 165/163 |
| 2129508 | 10/1972 | France | 165/163 |
| 2179839 | 11/1973 | France | 376/405 |

*Primary Examiner*—Deborah L. Kyle
*Assistant Examiner*—Dan Wasil
*Attorney, Agent, or Firm*—Pollock, Vande Sande & Priddy

[57] ABSTRACT

Device for the emergency removal of the heat dissipated by a fast breeder nuclear reactor when shut down, comprising a liquid-liquid heat exchanger immersed in the vessel of the reactor and a liquid-air exchanger for the cooling of the secondary liquid of the latter exchanger. The liquid-liquid comprises a casing composed of a sleeve (18,19) having openings (21,22) for the natural circulation of the cooling fluid of the reactor in contact with the tubes (25) of a nest (20) disposed in the casing of the exchanger. Each of the tubes (25) includes a straight input section and a long straight return section, separated by a helically wound section forming a loop with a low number of turns, inclined to a small extent with respect to the horizontal plane. The coil diameter of the tubes (25) is constant and identical for all the tubes and very slightly less than the interior diameter of the sleeve (18,19).

The invention applies in particular to liquid sodium-cooled fast breeder nuclear reactors.

8 Claims, 5 Drawing Figures

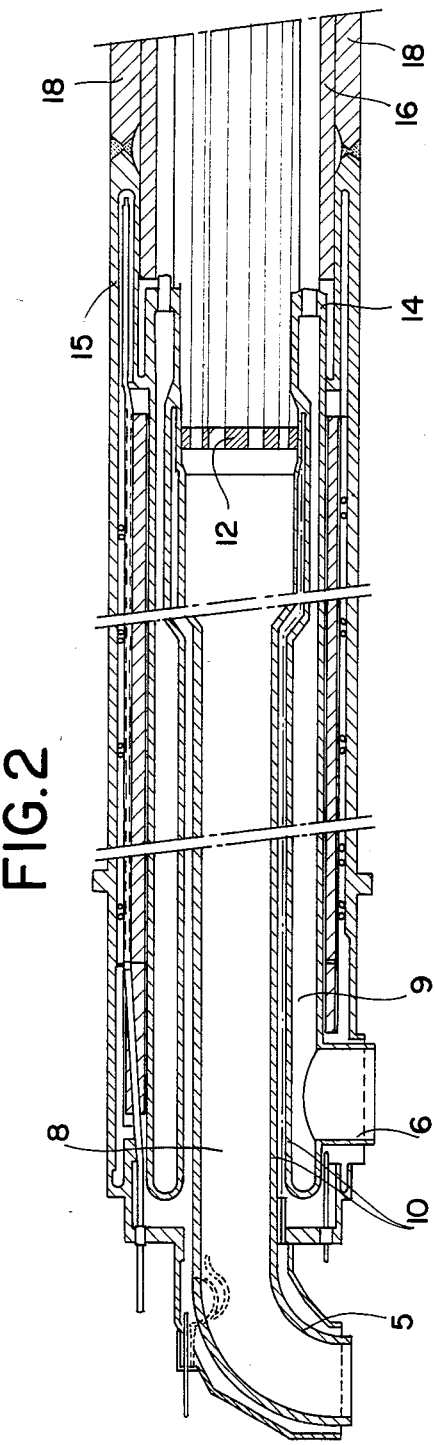
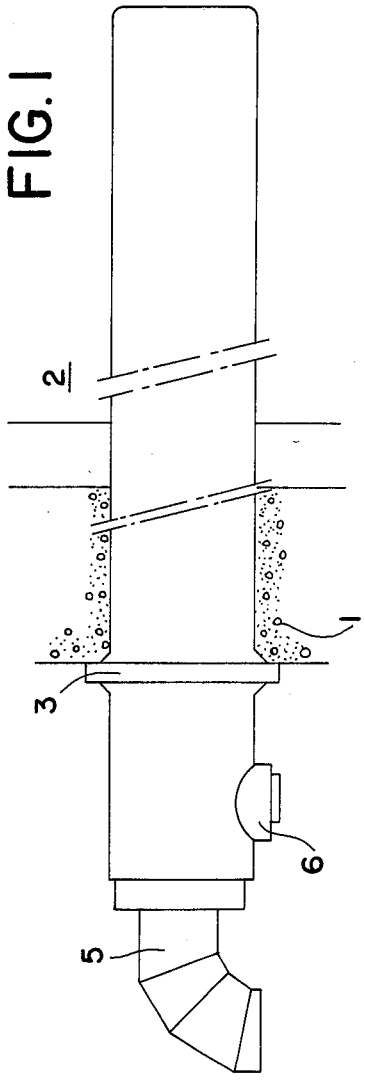
FIG.2
FIG.1

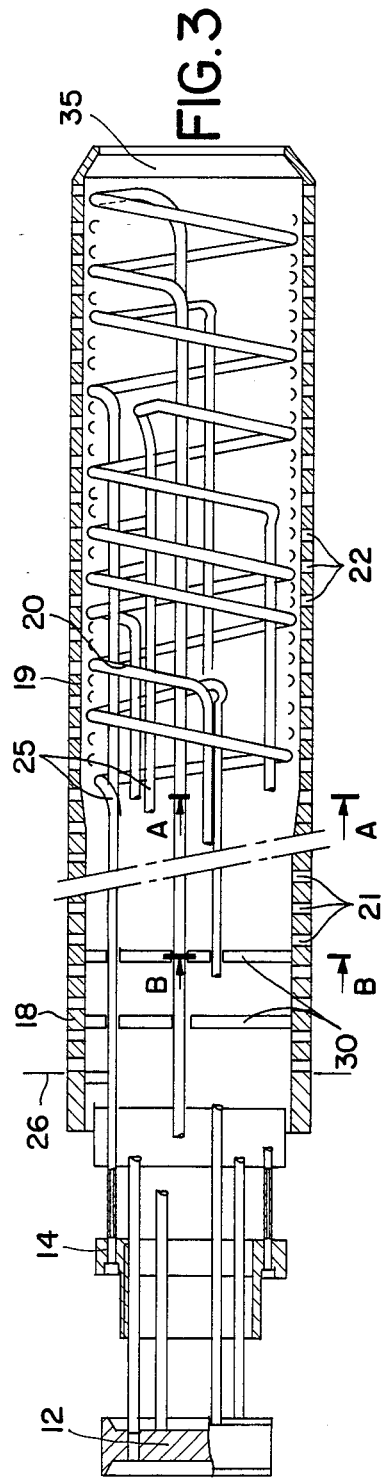
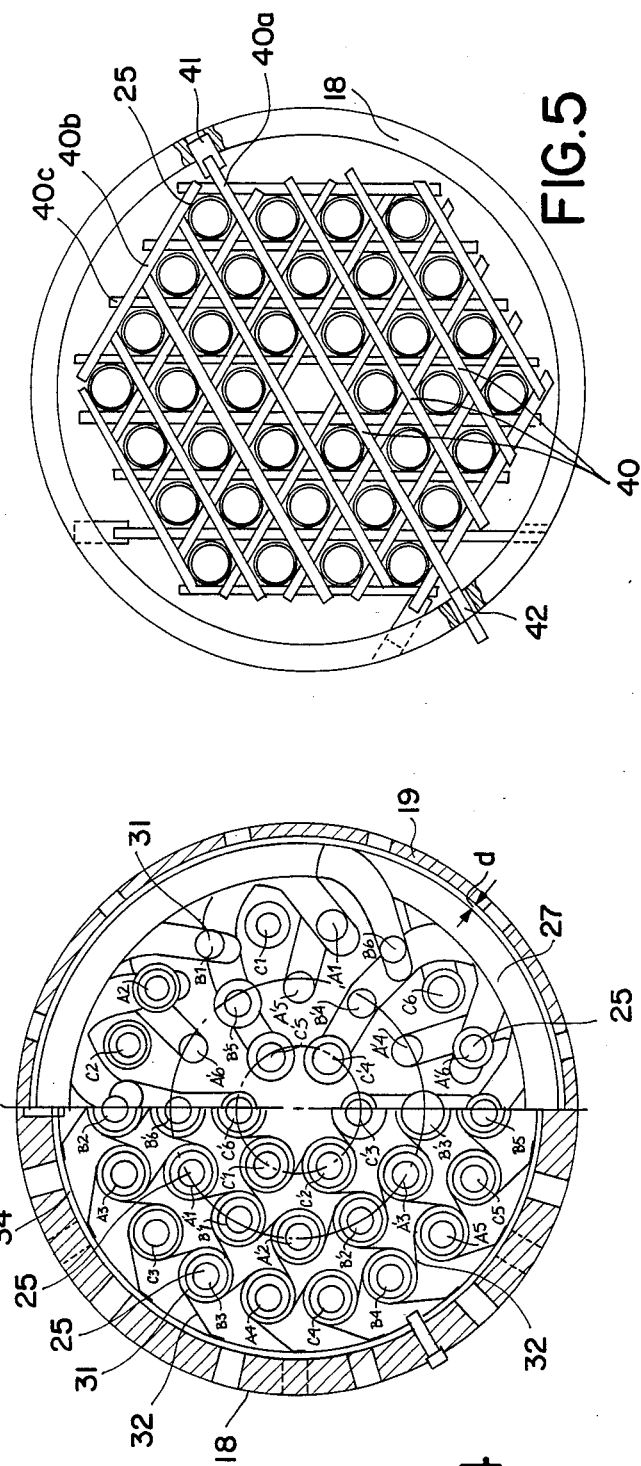

DEVICE FOR EMERGENCY REMOVAL OF THE HEAT DISSIPATED BY A FAST BREEDER NUCLEAR REACTOR WHEN SHUT DOWN

FIELD OF THE INVENTION

The invention relates to a device for emergency removal of the heat dissipated by a fast breeder nuclear reactor when shut down.

BACKGROUND OF THE INVENTION

A reactor of this type generally comprises a core composed of fuel assemblies immersed in a liquid metal such as sodium filling the reactor vessel, this vessel being closed by a very thick slab.

The liquid sodium constitutes the cooling fluid of the core which takes up the heat given off by the fuel assemblies.

There are components which cross the reactor slab and are immersed in the liquid sodium filling the vessel. Thus primary fluid circulation pumps and intermediate exchangers immersed in the liquid sodium make it possible to extract heat from the reactor during the its operation.

In the case where the reactor is shut down by introducing control rods in maximum insertion position into the fuel assemblies, the nuclear reaction stops with the neutrons produced by the core being absorbed by the control rods.

However, the nuclear reactor continues to produce a certain amount of heat, because of the residual activity of the reactor core.

Immediately after shutdown, the power of the reactor does not fall to a zero value but very quickly to a fraction of a percent of the nominal power, and decreased only slowly thereafter.

This residual power for large reactors of 3000 MW thermal power, for example, is nevertheless significant in absolute terms and leads to an increase in the internal temperature which can be dangerous above a certain level.

During the period when it is shut down, the reactor core therefore continues to dissipate a certain quantity of heat due to the nuclear reactions of the materials of which it is composed which have been activated during the operating period of the reactor.

It is necessary to remove the heat thus dissipated by the reactor and taken up by the liquid sodium constituting the primary fluid, in order to avoid an excessive rise in temperature in the interior of the vessel.

This removal of heat is normally provided by the device which exracts the heat from the reactor during operation. This device includes intermediate exchangers which extract the heat from the primary fluid, inside the vessel, by thermal contact of this primary fluid with the secondary fluid, generally liquid sodium, which itself is used to heat feed water and transform it into steam.

This device for removing the heat from the reactor generally comprises several independent assemblies each including a circulating pump, one or more exchangers and a steam generator.

In the case where the reactor is shut down, the function of removing the residual heat from the reactor can be provided by a single assembly of means a type similar type to those described above, since the power to be removed is only a small fraction of the total power of the reactor.

In the case where one or more of these assemblies becomes inoperable, the function can be provided by a single one of these assemblies.

However, in the case where the shutdown of the reactor is a result of a very serious accident to the reactor, it is possible that none of the assemblies for removing the heat from the reactor in normal operation may be available.

On large reactors, therefore a device which is totally independent of the normal cooling circuit of the reactor is provided for the removal of the heat dissipated by the reactor when shut down.

An auxiliary device of this type for the removal of heat includes one or more exchangers of the sodium-sodium type immersed directly in the sodium contained in the reactor vessel and one or more exchangers of the sodium-air type for the cooling of the secondary sodium from the sodium-sodium heat exchanger.

The primary sodium is thus cooled in contact with the secondary sodium in the sodium-sodium heat exchanger, and the secondary sodium is itself cooled inside a sodium-air exchanger before being returned to the sodium-sodium exchanger.

The use of secondary sodium makes it possible to avoid contact between the primary sodium which is contained in the vessel and which has a certain radioactivity, with the cooling air outside the vessel.

In order that a device of this type for removing heat from the reactor when shut down may function in place of the device for normal extraction of the heat from the reactor, after an accident hes put this device for normal extraction out of use, it is necessary that the auxiliary device for removal of the heat has a very reliable operation, has great strength and contains very few active elements.

In fact, in the case of an earthquake having damaged the reactor or in the case of an accident in the core having destroyed the latter in such a way that it is out of operation but still intact, it is necessary to retain a facility for removing the heat due to the residual activity of the reactor core.

Moreover, the sodium-sodium exchangers used for the extraction of the heat dissipated by the reactor when shut down must take up a small amount of room on the reactor slab which carries a large number of components, some of which are very large, such as the primary pumps and the intermediate exchangers which provide the circulation of the primary fluid and the extraction of heat during normal operation of the reactor. The sodium-sodium exchangers of the auxiliary device for removing heat must therefore have a small diameter, for example less than 600 mm.

Heat exchangers are known which comprise an external casing, open at its lower end, immersed in the sodium of the vessel and enclosing a nest of helically wound tubes inside which the secondary cooling sodium circulates. These tubes are connected to two tube plates of which one emerges in the inside of the upper part of the heat exchanger in a zone where the secondary sodium arrives and the other emerges in an extraction zone of the heated secondary sodium.

However, device of this type does not have a sufficient strength to be assured of its operation when subject to large-amplitude external stresses, such as those accompanying an earthquake.

In addition, in a device of this type, the nest of helical tubes occupies a large fraction of the interior volume of the external casing, with the result that the circulation of primary sodium in contact with the tubes of the nest is considerably slowed down. Forced circulation of the sodium inside the casing of the heat exchanger must be provided, and this forced circulation requires active elements such as pumps, in particular of the mechanical type, which can easily be put out of action if an earthquake occurs.

SUMMARY OF THE INVENTION

The aim of the invention is therefore to propose a device for the emergency removal of the heat dissipated by a fast breeder nuclear reactor when shut down, this reactor including a core composed of fuel assemblies, immersed in a liquid metal filling the reactor vessel and constituting the primary cooling fluid taking up the heat of the reactor, the heat removal device comprising at least one liquid-liquid heat exchanger composed of an external casing, open at its lower part, immersed in the cooling fluid and enclosing a nest of tubes fixed on at least one tube plate inside the casing and each comprising a rectilinear part, then a helically wound part and another rectilinear part, and inside which a liquid circulates, the cooling of which is provided by at least one heat exchanger using air for the cooling of the liquid, it being necessary for this heat removal device to continue to operate even in the event of a very serious incident, such as an earthquake, occurring to the nuclear reactor, without using active elements for the circulation of the primary cooling fluid.

With this aim, the external casing of the liquid-liquid heat exchanger, of elongate cylindrical form, disposed with its axis vertical in the reactor vessel, is composed, at least in its lower part, of a thick sleeve of high mechanical strength, pierced, over the whole length immersed in the primary cooling fluid, with openings making possible the natural circulation of the cooling fluid in contact with the tubes of the nest disposed inside the sleeve, and each including a straight liquid input part and a straight liquid return part, of great length, separated by a helically wound part forming a loop with a small number of turns inclined to a small extent with respect to the horizontal plane, the coil diameter of the tubes being constant and identical for all of the tubes and very slightly less than the internal diameter of the sleeve which holds the tubes in place in the event of external stresses.

BRIEF DESCRIPTION OF THE DRAWINGS

In order that the invention may be more clearly understood, an embodiment of a heat removal device according to the invention, in the case of a fast breeder nuclear reactor cooled by liquid sodium, will now be described by way of example with reference to the annexed drawings.

FIG. 1 shows an elevation view of the liquid-liquid exchanger assembly of the heat removal device of the reactor when shut down.

FIG. 2 shows a sectional view through a vertical plane of symmetry of the upper part of this heat exchanger.

FIG. 3 shows the lower part of the heat exchanger in a sectional view through a vertical plane of symmetry.

FIG. 4 shows in its right hand part a section along A—A of FIG. 3 and in its left hand part a section along B—B of FIG. 3.

FIG. 5 shows a different method of making the crosspieces to hold the straight parts of the tubes, in a cross-sectional view analogous to the section B—B.

DESCRIPTION OF PREFERRED EMBODIMENT

FIG. 1 shows a heat exchanger whose upper part is disposed above the slab 1 closing the vessel of a fast breeder nuclear reactor and whose lower part is immersed below the level 2 of the liquid sodium filling the reactor vessel which contains the reactor core.

The heat exchanger rests on the slab by means of a flange 3 and includes, in its part situated above the slab, a nozzle 5 for the entry of the secondary sodium into the exchanger and a nozzle 6 for the return of this sodium after it has been heated by the primary liquid sodium in which the lower part of the exchanger is immersed.

The nozzles 5 and 6 are connected to pipes forming part of a circuit which also contains a circulation pump and a sodium-air heat exchanger which makes cooling of the secondary sodium possible.

As shown in FIG. 2, the nozzle 5 emerges into a vertical cylindrical space 8 arranged in the central part of the heat exchanger, while the nozzle 6 emerges into an annualr peripheral space 9 separated from the cylindrical space by a double-layered wall 10. In the internal space between the layers of wall 10 a sweep gas such as argon is passed which makes it possible to insulate thermally the space 8 from the space 9 of the heat exchanger.

The cooled secondary sodium therefore penetrates into the exchanger via the central space 8 while the heated sodium comes out of the exchanger again via the peripheral space 9.

At its lower part, the central space 8 connects with a tube plate 12 on which the input ends of the tubes of the nest are fastened.

At its lower part, the peripheral space 9 connects with an annular tube plate 14 on which the output ends of the tubes of the nest are fastened.

Throughout its upper part shown in FIG. 2, the exterior casing 15 of the steam generator is made in the form of a double casing whose interior space is filled with a heat insulator 16.

The zone for output of the secondary sodium from the heat exchanger and input of the secondary sodium to the heat exchanger, in the region of the nozzles 5 and 6, is also protected against heat losses by a layer of heat-insulating material surrounding the heat exchanger.

In this way, the cooled secondary sodium is insulated from the hot secondary sodium which has circulated in thermal contact with the primary sodium, throughout the upper part of the heat exchanger, above the tube plates 12 and 14.

The secondary sodium is also thermally insulated from the external environment.

FIG. 3 shows the lower part of the heat exchanger, below the tube plates 12 and 14. This part of the exchanger is composed of a very thick sleeve 18 welded at its upper part to the double casing 15 of the upper part of the heat exchanger, and at its lower part to a thinner sleeve 19.

The unit comprising the sleeves 18 and 19 enclosing the nest 20 is very rigid and has very great mechanical strength. The thickness of sleeves 18 and 19 has been chosen so that the unit can effectively protect the nest 20 in the event of an earthquake and also in the event of an accident to the core, in order to maintain a facility for cooling the primary sodium filling the reactor vessel.

For example, in the case of a heat exchanger whose height below the level of the support flange 3 is of the order of 9 meters, the thickness of the sleeve 18 is 2.5 cm and the thickness of the sleeve 19 is 0.75 cm.

Throughout the part which is immersed in the sodium, the sleeves 18 and 19 are pierced with circular openings 21 and 22 respectively. These openings 21 and 22 allow the primary sodium filling the vessel to circulate inside the sleeves 18 and 19, in contact with the tubes of the nest 20.

Nest 20 will now be described by reference to FIGS. 3 and 4.

The nest 20 is composed of an assembly of tubes 25 each of which comprises a long straight part for the entry of the liquid sodium, which straight part is fixed at its upper end to the tube plate 12, a long straight part for the return of the liquid sodium, which straight part is fixed at its upper end to the tube plate 14 and a connection between these two straight parts composed of a helically wound loop inclined to a small extent with respect to the horizontal and whose coil diameter is slightly less than the internal diameter of the sleeve 19.

The straight parts of the tubes are disposed inside the sleeve 18, and the helically wound loops, whose coil diameter is constant and the same for all the tubes, are disposed inside the sleeve 19.

Each helically wound loop of the tubes has about one and a half turns and is interleaved with the helically wound loops of the two other neighboring tubes 25 of the nest to form a multiple-pitch helix.

As shown in FIG. 4, the nest comprises eighteen tubes whose output ends are connected to the tube plate 14 in one tier and whose input ends are connected to the plate 12 in two tiers of which one contains 12 tube ends and the other six ends.

The straight output sections and the loops of the tubes have been designated, according to the angular position of the straight output sections of these tubes, by the letters A, B and C, followed by an index which is one of the FIGS. 1, 2, 3, 4, 5 and 6.

The straight input section of the tube is designated in the same way as the output section and the helically wound loop, but with the index '.

The straight input section $A_1'$ thus corresponds to the output section and to the loop $A_1$.

As shown in FIG. 3, the helically wound loops of the tubes are disposed one after another in the vertical direction and in interleaved fashion.

The input and output sections of the tubes 25 disposed successively along the height of the heat exchanger, for example $B_2$, $B_6$, $B_4$, are disposed at an angle of 120° from each other, as shown in FIG. 4.

In this way the assembly of the loops constitutes a helix comprising three tubes per pitch.

The lengths of the tubes 25 do not differ very much since only the straight parts of these tubes have different lengths, as a function of the height of the helically wound loop in the heat exchanger.

Moreover, as the coil diameter of every turn is identical, the circulation of primary sodium inside the sleeve 19, in contact with the nest, may occur inside the channel formed by the successive turns disposed one above the other.

The channel section of the primary sodium is therefore large, so that it is not necessary to generate a forced circulation, and natural convection is sufficient to ensure the circulation of this primary sodium.

In fact, in operation, the exchanger is immersed in the primary sodium up to the level 26, and the openings 21 and 22 allow for the entry of primary sodium into the sleeves 18 and 19 enclosing the nest.

With cold sodium flowing in the nest, the primary sodium wihch penetrates the sleeves 19 and 18 through all the orifices is cooled by contact with these tubes, falls inside the sleeves 19 and 18 in contact with the tubes of the nest, becoming more and more cooled, to return to the lower part of the heat exchanger.

A circulation by descending natural convection is thus established inside the sleeves 18 and 19.

Furthermore, FIG. 4 shows that the space which exists between the turns of the helically wound loops of the tubes and the interior wall of the sleeve 19 is very small, and that plates such as 27 are welded to this internal wall to provide for the centering and the retention of the nest in the horizontal direction.

In this way, the nest is perfectly retained inside the sleeve 19, which is itself fixed in a very rigid way by the sleeve 18 to the lower part of the heat exchanger.

This heat exchanger fixed rigidly on the slab 1 of the reactor thus constitutes a strong assembly, in the event of an earthquake or of significant incidents in the reactor. It is sufficient therefore to provide a continuous circulation of the secondary sodium inside the tubes of the exchanger in order that the function of primary fluid cooling continues to be ensured.

By way of example, an exchanger of 400 mm diameter and immersed 4.5 meters in primary sodium makes it possible to remove 6 MW of thermal power.

The left hand part of FIG. 4 and FIG. 3 show that the straight parts of the tubes are retained inside the heat exchanger in precise positions by means of cross-pieces 30 spaced according to the height of the exchanger.

These cross-pieces are composed of an assembly of collars 31 surrounding the tubes 25 with a certain amount of clearance, each collar being connected by welding to three fixing elements 32.

The fixing elements 32 make it possible to tie the collars 31 to each other and to tie the assembly of these collars to a cylindrical sleeve 34 which is itself fixed on the internal surface of the sleeve 18.

To do that, one of the devices 32 associated with each of the collars situated at the periphery of the exchanger, i.e., the collars associated with the straight output sections of the liquid sodium, is fixed by welding to the sleeve 34.

By means of the cross-pieces 30, the assembly of the nest of tubes is held in precise position inside the casing of the heat exchanger.

A second embodiment of the cross-pieces intended to hold the straight parts of the tubes 25 is shown in FIG. 5. Horizontal rods 40 are fixed by welding to the casing 18 by one of their ends 42, inside an opening which traverses this casing, the other end, which is firmly fastened to a junction piece 41, being inserted in another opening of the casing 18. These rods are disposed between the tubes 25. A first assembly of horizontal rods 40a is arranged in a first direction of the transverse plane. A second assembly of rods 40b is disposed beneath the assembly of rods 40a with a certain interval between them and in a second direction making an angle of 120° with the direction of the rods 40a of the first assembly. A third assembly 40c is disposed below the assembly 40b and consists of rods making an angle of 120° with the rods of the assemblies 40a and 40b.

The straight parts of the tubes 25 are thus perfectly retained in all directions of the transverse plane, by means of sets of three assemblies of superposed horizontal parallel rods, regularly distributed along the length of the rectilinear part of the tubes 25. This embodiment of cross-pieces also enables the circulation of the liquid sodium in contact with the tubes of the nest to be impeded to the smallest possible extent.

The lower part of the sleeve 18 includes a section 35 which has been peened over so that the nest of tubes may be retained in the event of total or partial rupture of the nest. A fall of the nest into the vessel of the nuclear reactor is thus avoided.

It is seen that the principal advantages of the device according to the invention are that it can function without active means for the circulation of the primary sodium in contact with the tubes of the nest and that it can resist large external stresses such as those accompanying an earthquake or an accident in the core.

The resistance of the heat exchanger to external stresses comes from the fact that the casing of the nest of tubes has great rigidity and mechanical strength and securely holds the nest whose spiral turns have a diameter close to the interior diameter of the casing.

In addition, the circulation of the primary liquid sodium inside this casing, in contact with the tubes of the nest, is greatly facilitated by the fact that all the turns have the same diameter and are stacked vertically inside the heat exchanger. These turns are actively involved in the cooling.

It is possible to imagine tubes disposed in a different way to make the nest, that these tubes can have a helical portion comprising a greater or lesser number of turns and that they can be differently connected to one or more tube plates.

It is also evident that there may be any number of tubes in the nest.

However, in order not to overcomplicate the construction and the structure of the heat exchanger, it is preferable to have the smallest possible number of tubes compatible with the desired efficiency of the heat exchange device.

Finally, the device according to the invention is applicable to all the fast breeder nuclear reactors having a vessel containing a primary fluid, whatever the nature of this primary cooling fluid may be.

We claim:

1. A device for the emergency removal of the heat dissipated by a fast breeder nuclear reactor when shut down, said reactor having a core composed of fuel assemblies, immersed in a liquid metal filling the reactor vessel and constituting the primary cooling fluid taking up the heat of the reactor, said heat removal device comprising at least one liquid-liquid heat exchanger composed of an external casing (15, 18, 19) open at its lower part and having openings in its wall immersed in said primary cooling fluid and enclosing a bundle (20) of tubes (25) fixed on at least one tube plate (12, 14) inside said casing (15, 18, 19) and each comprising a rectilinear part, then a helically wound part and another rectilinear part and inside which a liquid circulates whose cooling is provided outside the casing of said heat exchanger, said external casing comprising an elongate cylindrical sleeve disposed with its axis vertical in said reactor vessel having a thickness such that it remains substantially undeformed under stresses, and said tubes constituting said bundle each comprising a vertical straight liquid input part and a vertical straight liquid return part extending parallel thereto along substantially the whole length of said tube in the vertical direction and held in position by a plurality of transverse cross-pieces fixed on an internal face of said casing and an intermediary helically wound part having only about one loop and a half, said loops of all the tubes of said bundle being disposed in substantially horizontal planes with their axes along the axis of said cylindrical sleeve and having a same diameter which is substantially equal to the internal diameter of said sleeve.

2. The heat removal device as claimed in claim 1, wherein the helically wound loops of the tubes (25), disposed successively in the vertical direction, are interleaved in such a way as to produce a multiple-pitch helix.

3. The heat removal device as claimed in claim 2, wherein the helically wound loops of said tubes (25) of said bundle (20) disposed successively in the vertical direction of said heat exchanger are offset by 120° with respect to each other in relation to a rotation round the axis of the casing (15, 18, 19) of said exchanger, said tubes constituting a helix with three tubes (25) per pitch.

4. The heat removal device as claimed in claim 1 or 2, wherein the sleeve inside which said bundle (20) of tubes (25) is disposed is composed of two successive parts (18, 19) in the vertical direction, the upper part (18) having a greater thickness than the lower part (19).

5. The heat removal device as claimed in claim 1 or 11, wherein said sleeve (18, 19) includes a part (35) of smaller diameter at its lower end to retain said bundle (20) in the event of rupture of the latter.

6. The heat removal device as claimed in claim 1 or 2, wherein the straight parts of said tubes (25) are held in position inside the casing (18, 19) of said heat exchanger by cross-pieces (30) composed of collars (31) disposed around each of the straight parts of said tubes (25) of the bundle (20) connected to each other and to a sleeve (34) fixed on the interior wall of the casing (18, 19) of said heat exchanger by means of fixing pieces (32).

7. The heat removal device as claimed in claim 1 or 11, wherein the straight parts of said tubes (25) are held in position inside the casing (18, 19) of said heat exchanger by assemblies of horizontal parallel rods (40) fixed to said casing (18, 19) and disposed between said tubes (25), several assemblies being disposed one above the other with spacing in the vertical direction to constitute a cross-piece, and the rods (40a) of an assembly being disposed at a constant angle with respect to the rods of the other assemblies (40b and 40c).

8. The removal device as claimed in claim 7, wherein said assemblies of rods are grouped in sets of three assemblies (40a, 40b, 40c), the rods (40) of one assembly (40a) being disposed at an angle of 120° with respect to the rods of the two other assemblies (40b, 40c).

* * * * *